United States Patent
Oshiumi et al.

(10) Patent No.: US 9,758,156 B2
(45) Date of Patent: Sep. 12, 2017

(54) CONTROL SYSTEM FOR HYBRID VEHICLE

(71) Applicant: TOYOTA JIDOSHA KABUSHIKI KAISHA, Toyota-shi, Aichi-ken (JP)

(72) Inventors: Yasuhiro Oshiumi, Gotemba (JP); Makoto Hirai, Shizuoka-ken (JP); Koji Hokoi, Toyota (JP); Takanori Aoki, Nisshin (JP); Hideo Nakatsukasa, Susono (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/061,046

(22) Filed: Mar. 4, 2016

(65) Prior Publication Data

US 2016/0257297 A1 Sep. 8, 2016

(30) Foreign Application Priority Data

Mar. 6, 2015 (JP) ................. 2015-044521

(51) Int. Cl.
*B60L 11/00* (2006.01)
*G06F 7/00* (2006.01)
(Continued)

(52) U.S. Cl.
CPC .............. *B60W 20/14* (2016.01); *B60K 6/445* (2013.01); *B60L 7/10* (2013.01); *B60L 15/20* (2013.01);
(Continued)

(58) Field of Classification Search
CPC ...... B60W 10/08; B60W 10/06; B60W 20/00; B60W 2510/244; B60W 2710/083; B60W 20/40; B60W 2510/0638; B60W 2510/081; B60W 2540/12; B60W 30/18127; B60W 10/26; B60W 20/10; B60W 2510/0657; B60W 10/11; B60W 20/14; B60W 2520/04; B60W 2710/0644; B60W 2710/105; B60W 30/18109; Y02T 10/7005; Y02T 10/7044; Y02T 10/6226; Y02T 10/648;
(Continued)

(56) References Cited

U.S. PATENT DOCUMENTS 5,967,940 A * 10/1999 Yamaguchi .............. B60K 6/24
477/107
6,215,198 B1 * 4/2001 Inada ....................... B60K 6/46
290/40 A
(Continued)

FOREIGN PATENT DOCUMENTS

JP 05-319110 A 12/1993
JP 2010-0585579 A 3/2010
JP 2013-129380 A 7/2013

*Primary Examiner* — Khoi Tran
*Assistant Examiner* — Jorge Peche
(74) *Attorney, Agent, or Firm* — Andrews Kurth Kenyon LLP

(57) ABSTRACT

A control system for a hybrid vehicle configured to reduce frequency of establishing an engine braking force is provided. The control system is configured to operate a first motor as a motor to increase torque of an output member while halting the output shaft of the engine by a brake, and to increase the deceleration torque of the second motor, if a state of charge of the battery is higher than a predetermined threshold level when deceleration of the hybrid vehicle is demanded.

5 Claims, 5 Drawing Sheets

(51) Int. Cl.
*G06F 17/00* (2006.01)
*B60W 20/14* (2016.01)
*B60L 15/20* (2006.01)
*B60L 7/10* (2006.01)
*B60K 6/445* (2007.10)
*B60W 10/08* (2006.01)
*B60W 30/18* (2012.01)
*B60W 20/15* (2016.01)

(52) U.S. Cl.
CPC ............ *B60W 10/08* (2013.01); *B60W 20/15* (2016.01); *B60W 30/18127* (2013.01); *B60W 2710/083* (2013.01); *Y02T 10/6239* (2013.01); *Y02T 10/7077* (2013.01); *Y02T 10/7275* (2013.01); *Y10S 903/906* (2013.01); *Y10S 903/947* (2013.01)

(58) Field of Classification Search
CPC ... Y02T 10/70; Y02T 10/705; Y02T 10/7241; Y02T 10/48; Y02T 10/6252; Y02T 10/641; Y02T 10/642; Y02T 10/7083; Y02T 10/90; Y02T 10/7066; Y02T 10/7283; B60L 2240/423; B60L 2240/421; B60L 15/2009; B60L 11/14; B60L 11/1861; B60L 2240/441; B60L 7/10
See application file for complete search history.

(56) References Cited

U.S. PATENT DOCUMENTS

| | | | | |
|---|---|---|---|---|
| 6,338,391 B1* | 1/2002 | Severinsky | ............ | B60K 6/442 180/65.23 |
| 6,340,339 B1* | 1/2002 | Tabata | ............ | B60K 6/26 180/65.26 |
| 2002/0167296 A1* | 11/2002 | Nagata | ............ | H02J 7/1446 320/155 |
| 2006/0101823 A1* | 5/2006 | Takemoto | ............ | B60K 6/24 60/716 |
| 2006/0243501 A1* | 11/2006 | Hidaka | ............ | B60K 6/48 180/65.1 |
| 2006/0289208 A1* | 12/2006 | Katsuhiro | ............ | B60K 6/44 180/65.225 |
| 2007/0102208 A1* | 5/2007 | Okuda | ............ | B60K 6/48 180/65.31 |
| 2008/0045382 A1* | 2/2008 | Kawasaki | ............ | B60K 6/365 477/115 |
| 2009/0301796 A1* | 12/2009 | Wedderburn, Jr. | ...... | B60K 6/12 180/2.2 |
| 2010/0070122 A1* | 3/2010 | Niimi | ............ | B60K 6/445 701/22 |
| 2010/0116235 A1* | 5/2010 | Imamura | ............ | B60W 10/30 123/179.3 |
| 2011/0034297 A1* | 2/2011 | Jerwick | ............ | B60K 6/48 477/5 |
| 2011/0178664 A1* | 7/2011 | Yamamoto | ............ | B60L 3/0046 701/22 |
| 2012/0010771 A1* | 1/2012 | Kato | ............ | B60K 6/445 701/22 |
| 2012/0016547 A1* | 1/2012 | Aridome | ............ | B60K 6/445 701/22 |
| 2012/0072062 A1* | 3/2012 | Ando | ............ | B60K 6/365 701/22 |
| 2013/0041543 A1* | 2/2013 | Takayanagi | ............ | B60K 6/445 701/22 |
| 2013/0073136 A1* | 3/2013 | Yamamoto | ............ | B60K 6/445 701/22 |
| 2014/0097676 A1* | 4/2014 | Kusumi | ............ | H02J 7/045 307/10.1 |
| 2014/0136039 A1* | 5/2014 | Tanishima | ............ | B60K 6/48 701/22 |
| 2014/0277879 A1* | 9/2014 | Sheidler | ............ | A01D 41/12 701/22 |
| 2015/0046009 A1* | 2/2015 | Maruyama | ............ | B60K 6/445 701/22 |
| 2016/0016483 A1* | 1/2016 | Yasunori | ............ | B60L 11/14 320/162 |
| 2016/0059843 A1* | 3/2016 | Oguma | ............ | B60W 20/14 701/22 |
| 2016/0059844 A1* | 3/2016 | Ikedaya | ............ | B60W 10/18 701/22 |
| 2016/0059857 A1* | 3/2016 | Ikedaya | ............ | B60W 10/18 701/22 |
| 2016/0207418 A1* | 7/2016 | Bergstrom | .......... | B60L 11/1879 |
| 2016/0363109 A1* | 12/2016 | Akita | ............ | F02P 5/145 |

* cited by examiner

CONTROL SYSTEM FOR HYBRID VEHICLE

The present invention claims the benefit of Japanese Patent Application No. 2015-044521 filed on Mar. 6, 2015 with the Japanese Patent Office, the disclosures of which are incorporated herein by reference in its entirety.

BACKGROUND

Field of the Invention

Embodiments of the present invention relates to the art of a control system for a hybrid vehicle having different kinds of prime movers such as an internal combustion engine and a motor, and especially to a control system for controlling a braking force established by the prime mover.

Discussion of the Related Art

JP-A-2013-129380 describes a hybrid vehicle in which a motor-generator establishes a braking force instead of an engine. The hybrid vehicle taught by JP-A-2013-129380 is provided with the engine, a first motor-generator that can control a speed of the engine, and a second motor-generator that can adjust an output torque. According to the teachings of JP-A-2013-129380, a control system is configured to operate the second motor-generator as a generator to establish a braking force when an accelerator pedal is returned to decelerate the vehicle. In addition, the control system is further configured to consume an electric power generated by the second motor-generator by cranking the engine by the first motor-generator if a battery is charged overly during establishing the braking force by the second motor-generator.

That is, according to the teachings of JP-A-2013-129380, the electric power generated by the second motor-generator is entirely stored into the battery during establishing the braking force by the second motor-generator, and hence the battery is fully charged frequently if the vehicle is decelerated frequently. As described, the control system taught by JP-A-2013-129380 carries out a cranking of the engine by the first motor-generator if the battery is fully charged. For this reason, the engine is activated frequently and hence a driver may feel discomfort.

SUMMARY

Aspects of embodiments of the present invention have been conceived noting the foregoing technical problems, and it is therefore an object of embodiments of the present invention is to provide a control system for a hybrid vehicle configured to reduce frequency of establishing a braking force by operating an engine to suppress discomfort.

The vehicle control system is applied to a hybrid vehicle comprising: a prime mover including an engine in which an output shaft is halted by a brake, a first motor, and a second motor that applies torque to an output member and that is electrically connected to the first motor through a battery; and a power distribution device that performs a differential action among a first rotary element, a second rotary element, and a third rotary element. In the hybrid vehicle, the engine is connected to a first rotary element, the first motor is connected to a second rotary element, and the output member is connected to a third rotary element. The control system is configured to operate the second motor as a generator to regenerate energy to establish a deceleration torque while charging the battery with an electric power generated by the second motor when deceleration of the hybrid vehicle is demanded. In order to achieve the above-explained objective, according to the preferred example, the control system is provided with a controller that controls the first motor and the second motor. Specifically, the controller is configured to operate the first motor as a motor to increase torque of the output member while halting the output shaft of the engine by the brake, and to increase the deceleration torque of the second motor, if a state of charge of the battery is higher than a predetermined threshold level when deceleration of the hybrid vehicle is demanded.

The controller may be further configured to calculate a required drive torque, and to control an output torque of the first motor and the deceleration torque of the second motor in such a manner to achieve the calculated required drive torque.

The controller may be further configured to control the first motor and the second motor in such a manner that the deceleration torque of the second motor is increased in an amount of the torque of the first motor to increase the rotational speed thereof.

The controller may be further configured to establish the deceleration torque by the second motor without operating the first motor as a motor if the state of charge of the battery is lower than the predetermined threshold level when a deceleration of the vehicle is demanded.

Specifically, the threshold level is set to be lower than an upper limit level of the state of charge of the battery.

Thus, the control system according to the preferred example is configured to operate the second motor as a generator to regenerate energy to establish a deceleration torque while charging the battery with an electric power generated by the second motor when deceleration of the hybrid vehicle is demanded under a condition that the battery is almost fully charged. According to the preferred example, therefore, deceleration torque of the second motor can be increased and power loss of the first motor serving as a motor can be increased. In this situation, power circulation is caused between the first motor and the second motor and hence an electrical loss of those motors may also be increased. For these reasons, the deceleration torque can be increased to the required value while increasing energy loss so that supply current to the battery can be reduced while increasing a length of time or frequency of regenerative braking. Consequently, it will take longer time to fully charge the battery to reduce frequency to rotate the engine compulsory, and hence discomfort resulting from unintentional rotation of the engine can be reduced.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Figure 6:
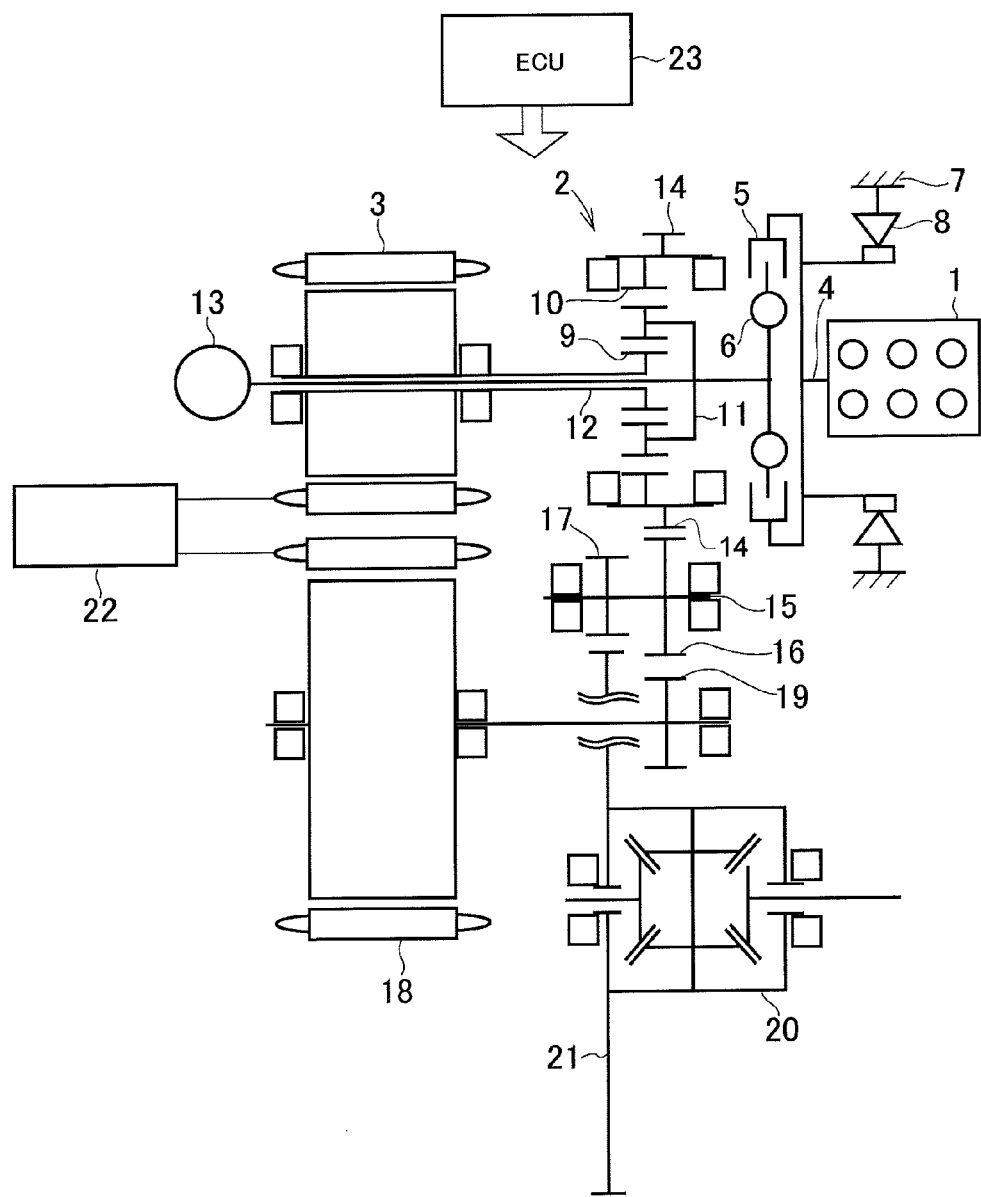
FIG. 6 is a skeleton diagram showing one example of a powertrain of the hybrid vehicle to which the control system according to the preferred example is applied.

Preferred example of the present invention will now be explained with reference to the accompanying drawings. Referring now to FIG. 6, there is shown a powertrain of the hybrid vehicle to which the control system according to the preferred example is applied. As illustrated in FIG. 6, the hybrid vehicle comprises an internal combustion engine (as will be simply called the "engine" hereinafter), and a pair of motors individually having a generating function. The hybrid vehicle of this kind may be powered by any one of the motors or both motors while stopping the engine. In the powertrain, specifically, a power distribution device 2 and a first motor 3 are arranged coaxially with the engine 1.

For example, a gasoline engine and a diesel engine may be used as the engine 1, and the engine 1 is started by compulsory rotating an output shaft 4 thereof (i.e., by a motoring or cranking). The output shaft 4 is connected to a damper device 6 through a clutch 5, and a brake 8 adapted to selectively halt the output shaft 4 is disposed between the output shaft 4 and a predetermined stationary member 7 such as a housing. For example, a one-way clutch, a friction brake, a dog clutch etc. may be used as the brake 8, and in the example shown in FIG. 6, the one-way clutch adapted to stop a counter rotation of the output shaft 4 opposite to an output rotation is employed as the brake 8. On the other hand, a friction clutch is used as the clutch 5 to selectively provide a connection between the engine 1 and the powertrain from the power distribution device 2.

The power distribution device 2 is a planetary gear unit adapted to distribute a power from the engine 1 to the first motor 3 (or MG1) and to an output side. Specifically, the power distribution device 2 comprises a sun gear 9, a ring gear 10, and a carrier 11 connected to an input shaft 12 while supporting pinion gears interposed between the sun gear 9 and the ring gear 10. One end of the input shaft 12 is connected to an output member of the damper device 6, and the input shaft 12 extends along a common rotational axis of the power distribution device 2 and the first motor 3 to be connected to an oil pump 13. That is, the oil pump 13 is driven by the engine 1 to establish a hydraulic pressure. Thus, the first motor 3 is disposed on the opposite side to the engine 1 across the power distribution device 2, and a rotor of the first motor 3 is connected to the sun gear 9. The ring gear 10 is integral with an output gear 14 as an output member.

A counter shaft 15 extends parallel to the input shaft 12. A driven gear 16 is fitted onto one end of the counter shaft 15 while being meshed with the output gear 14, while a drive gear 17 diametrically smaller than the driven gear 16 is fitted onto the other end of the counter shaft 15. The driven gear 16 is also meshed with a motor drive gear 19 fitted onto an output shaft of a second motor 18 (or MG2). As the first motor 3, the second motor 18 also has a generating function. In the powertrain shown in FIG. 6, an output torque of the second motor 18 can be added to the torque from the output gear 14, and the torque from the output gear 14 can be reduced by the second motor 18.

A differential gear unit 20 as a final reduction is disposed parallel to the input shaft 12 and the counter shaft 15, and a ring gear 21 of the differential gear unit 20 is meshed with the drive gear 17. Drive torque delivered to the differential gear unit 20 is distributed to both driving wheels (not shown).

The first motor 3 and the second motor 18 are individually connected to a battery 22 through an inverter and a booster converter (both not shown) so that an electric power can be transmitted therebetween. In order to control the motors 3 and 18, the battery 22, the clutch 5 and the engine 5, the hybrid vehicle is provided with an electronic control unit (to be abbreviated as the "ECU" hereinafter) 23 as a controller. The ECU 23 is composed mainly of a microcomputer configured to carry out a calculation based on incident data and preinstalled data, and to transmit a calculation result in the form of command signal. For example, torques of the motors 2 and 3, current values applied to the motors 2 and 3, a state of charge (to be abbreviated as the "SOC" hereinafter) of the battery 22 an opening degree of an accelerator, a vehicle speed, an engine speed so on are sent to the ECU 23, and maps determining a reduction torque with respect to the vehicle speed and so on are installed in the ECU 23.

Figure 7:
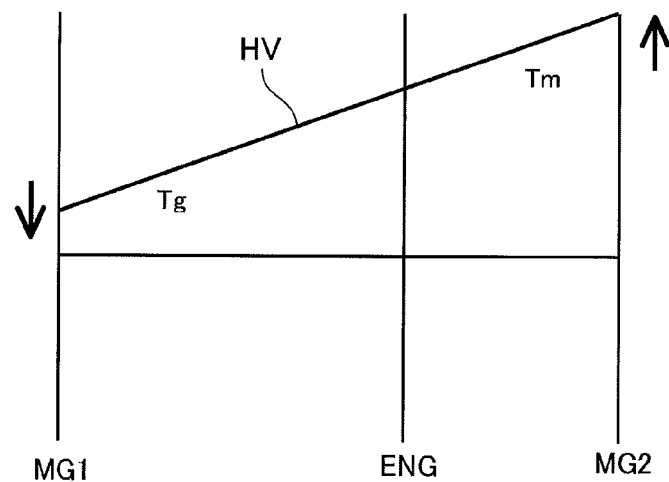
FIG. 7 is a nomographic diagram indicating a situation under the HV mode.

An operating mode of the hybrid vehicle thus structured is selected depending on a required driving force and a vehicle speed from hybrid mode (abbreviated as "HV" in the drawings), dual-motor mode (abbreviated as "2MG" in the drawings), and single-motor mode (abbreviated as "1MG" in the drawings). In the hybrid mode, specifically, the vehicle is powered by the engine 1 and the motors 3 and 18, and output power of the engine 1 is distributed to the sun gear 9 (or the first motor 3) and to the ring gear 10 (or the output gear 14) through the power distribution device 2. The power delivered to the ring gear 10 is further delivered to the differential gear unit 20 via the driven gear 16 and the drive gear 17. In this situation, the first motor 3 is operated as a generator to apply torque to the sun gear 9 in the direction of stopping a rotation of the sun gear 9. That is, the first motor 3 applies a counter torque resulting from generation to the sun gear 9, and a rotational speed of the engine 1 is adjusted in an optimally fuel efficient manner. An electric power generated by the first motor 3 is supplied to the second motor 18 to operate the second motor 18 as a motor. Thus, the power generated by the engine 1 is partially converted into the electric power by the first motor 3, and then converted into a mechanical power again by the second motor 18 to be delivered to the differential gear unit 20. Such situation under the hybrid mode is indicated in the nomographic diagram shown in FIG. 7.

Figure 8:
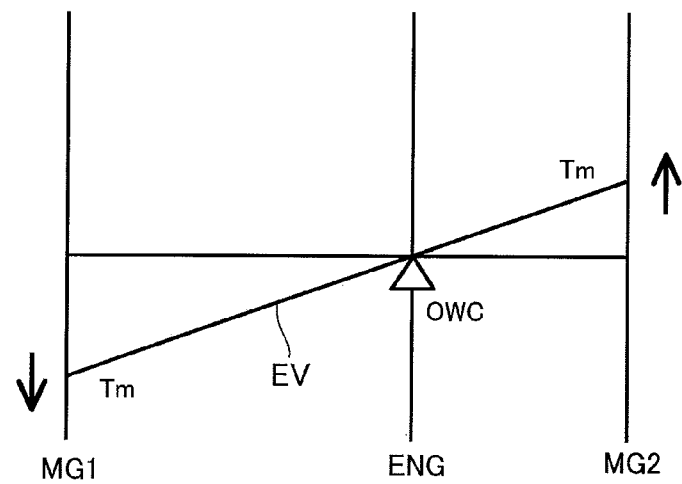
FIG. 8 is a nomographic diagram indicating situations under the 1MG mode and the 2MG mode.

The single motor-mode is selected when the required driving force is comparatively small. In the single-motor mode, specifically, the vehicle is powered by the second motor 18 while stopping fuel supply to the engine 1 and electric supply to the first motor 3. In this situation, the second motor 18 generates a torque Tm in the forward direction, and the torque Tm of the second motor 18 is delivered to the differential gear unit 20 via the driven gear 16 and the drive gear 17 to propel the vehicle. Such situation under the single motor-mode mode is indicated in the nomographic diagram shown in FIG. 8.

The dual motor-mode is selected when the required driving force is larger than that required under the single-motor mode. In the dual-motor mode, specifically, the vehicle is powered by both of the first motor 3 and the second motor 18 while stopping fuel supply to the engine 1. As described, the first motor 3 and the engine 1 are connected through the power distribution device 2. In this situation, therefore, the first motor 3 is driven in the counter direction to rotate the output gear 14 in the forward direction so that a counter torque is applied to the engine 1. Consequently, the brake 8 as a one-way clutch is brought into engagement to halt a rotation of the output shaft 4 of the engine 1 while establishing a reaction torque against a torque Tg generated by the first motor 3. Meanwhile, the second motor 18 generates the forward torque Tm, and hence the forward torque Tm is synthesized with the torque Tg of the first motor 3 at the driven gear 16 on the counter shaft 15 to be delivered to the differential gear unit 20. Such situation under the single dual-mode mode is indicated in the nomographic diagram shown in FIG. 8.

In any of the foregoing operating modes, the motors 3 and 18 are operated as a motor or a generator, and an energy regeneration is carried out when a deceleration is demanded by any of the motors 3 and 18 to improve fuel efficiency. The regenerated energy is stored into the battery 22. In this situation, if the battery 22 is fully charged, specifically, if the SOC of the battery 22 reaches the upper limit level, the battery 22 can no longer be charged with the regenerated energy and hence a regenerative braking (by the motor 3 or 18) would be restricted. In order to reduce frequency of establishing an engine braking force utilizing a power loss of the engine 1, the control system according to the preferred example is configured to carry out the following controls.

Figure 1:
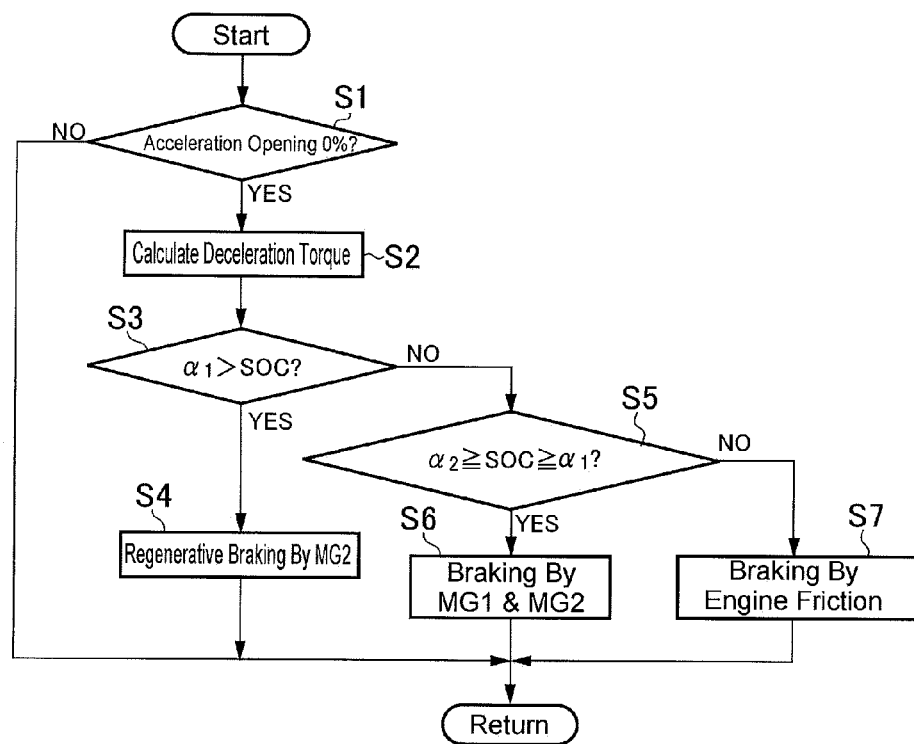
FIG. 1 is a flowchart showing one control example according to the present invention.
Figure 2:
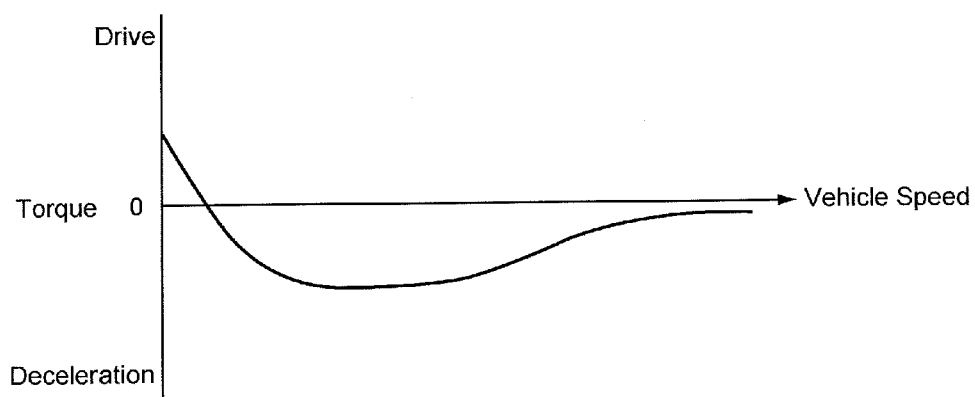
FIG. 2 is one example of a map determining a relation between a vehicle speed and a drive torque (i.e., a deceleration torque)

Turning to FIG. 1, there is shown a flowchart of the above-explained controls to be carried out by the control system during propelling the vehicle by the motors 3 and 18 while stopping the engine 1. First of all, it is determined whether or not an opening degree of the accelerator is "0%" at step S1. Basically, an accelerator pedal (not shown) is returned to decelerate the vehicle propelling at a speed higher than a predetermined level. That is, an existence of a deceleration demand is determined at step S1. If the answer of step S1 is NO, the routine is returned without carrying out any specific control. By contrast, if the deceleration of the vehicle is demanded so that the answer of step S1 is YES, a deceleration torque is calculated at step S2. A drive torque of the case in which the opening degree of the accelerator is "0%" is determined during a design phase of the hybrid vehicle with respect to the vehicle speed. As indicated in the map shown FIG. 2, a drive torque as a creep torque is generated within a low speed range from 0. In the speed range higher than the above-mentioned low speed range, the motor 3 or 18 exerts torque in a direction opposite from the rotational direction to decelerate or stop the vehicle. Such deceleration torque is increased until the vehicle speed is increased to a predetermined level, but reduced in the high speed range to stabilize vehicle behavior. At step S2, the deceleration torque (i.e., a negative torque) is thus obtained with reference to the map shown in FIG. 2.

Then, at step S3, it is determined whether or not the SOC of the battery 22 is lower than a first threshold level $\alpha1$. For example, the SOC of the battery 22 may be detected by a conventional method taught by JP-A-2007-17821. Specifically, the first threshold level $\alpha1$ is used to determine an execution of an after-mentioned braking control of the preferred example, and to this end, the first threshold level $\alpha1$ is set to be lower than an upper limit level as a second threshold level $\alpha2$ of the SOC of the battery 22 based on a result of experimentation or simulation.

If the SOC of the battery 22 is lower than the first threshold level $\alpha1$ so that the answer of step S3 is YES, regenerative braking of the second motor 18 is carried out at step S4 and then the routine is returned. In this case, the battery 22 as an electrical load can be charged with the electric power, and hence the second motor 18 is used as a generator to apply a regenerative braking force resulting from generation to the vehicle. In this situation, the deceleration torque is controlled in such a manner to achieve the value calculated at step S2.

Figure 3:
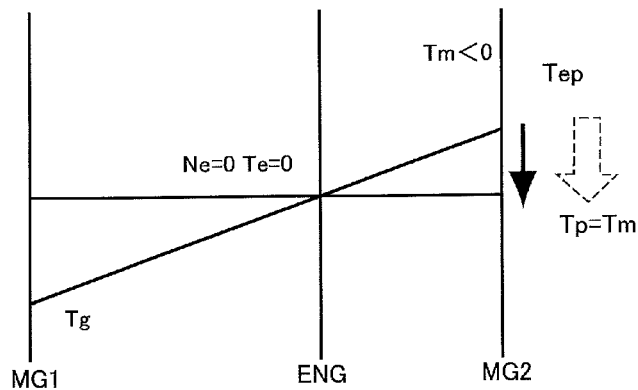
FIG. 3 is a nomographic diagram indicating a braking force control carried out at step S4.

A condition of the power distribution device 2 during the regenerative braking of the second motor 18 is indicated in the nomographic diagram shown in FIG. 3. In this situation, specifically, the ring gear 10 or the second motor 18 is rotated in accordance with the vehicle speed, and the second motor 18 exerts the torque Tm in the direction to reduce a rotational speed thereof. By contrast, since the fuel supply is stopped in this situation, the engine 1 is stopped by a friction itself or the like. That is, both of the rotational speed Ne and the torque Te of the engine 1 are "0". On the other hand, the sun gear 9 or the first motor 3 is controlled in such a manner to reduce the torque Tg thereof is reduced to "0", while being rotated at a speed determined by a structure of the power distribution device 2. Consequently, a drive torque Tp during the regenerative braking of the second motor 18 is governed by the drive torque Tm of the second motor 18.

By contrast, if the SOC of the battery 22 is higher than the first threshold level $\alpha1$ so that the answer of step S3 is NO, it is determined at step S5 whether or not the SOC of the battery 22 is higher than the first threshold level $\alpha1$ but lower than the second threshold level $\alpha2$. If the answer of step S5 is YES, this means that the battery 22 may be charged but almost fully charged. In this case, therefore, the vehicle is decelerated at step S6 using both of the first motor 3 and the second motor 18 and then the routine is returned. Specifically, the second motor 18 is used as a generator to establish the braking torque, while consuming the regenerated electric power by operating the first motor 3 as a motor to increase an energy loss.

Here will be explained the control executed at step S6 in more detail with reference to the nomographic diagram of the power distribution device 2 shown in FIG. 4. In this situation, the ring gear 10 or the second motor 18 is rotated in accordance with the vehicle speed, and the second motor 18 exerts the torque Tm in the direction to reduce a rotational speed thereof. By contrast, the first motor 3 is rotated as a motor by the electric power in the counter direction at a speed governed by the power distribution device 2, while exerting the torque Tg in the direction to increase the rotational speed thereof (i.e., a positive torque). In this situation, therefore, torque in the counter direction is applied to the output shaft 4 of the engine 1 through the carrier 11, but the brake 8 as a one-way clutch is brought into engagement to halt the counter rotation of the output shaft 4. Consequently, the carrier 11 is allowed to establish reaction torque. That is, the torque Tep of the first motor 3 is applied to the ring gear 10 or the output gear 14 integral therewith in the forward direction to propel the vehicle in the forward direction. Consequently, the drive torque Tp during the regenerative braking is established by the deceleration torque Tm of the second motor 18 and the forward torque Tep of the first motor 3 as expressed as Tp=Tm+Tep. The drive torque Tp thus established is adjusted in such a manner to achieve the torque calculated at step S2. As a result, the deceleration torque Tm of the second motor 18 is increased in the amount of the torque Tep of the first motor 3 to increase the rotational speed thereof in the counter direction. For this reason, the deceleration torque Tp in accordance with the vehicle speed can be maintained as that of the case shown in FIG. 3 in which only the second motor 18 establishes the deceleration torque Tp.

Thus, during decelerating the vehicle using both of the first motor 3 and the second motor 18, the deceleration torque Tm of the second motor 18 is increased while the first motor 3 serving as a motor generates a predetermined torque Tg. Consequently, power losses of the motors 3 and 18 and frictional loss in the powertrain are increased. In addition, generating amount (or a current) of the second motor 18 is increased and generated electric power is supplied to the first motor 3 so that Joule loss resulting supplying electric current to the first motor 3 is increased. Further, the mechanical power generated by the first motor 3 is converted into the electric power again by the second motor 18. As a result, an energy loss resulting from such power circulation between the first motor 3 and the second motor 18 is increased. That is, during execution of the braking control at step S6, the electric power generated by the second motor 18 is partially or mostly consumed to operate the first motor 3 as a motor and also consumed by the above-mentioned power losses. For this reason, the electric power supplied to the battery 22 can be reduced in comparison with that of the case in which only the second motor 18 establishes the braking force so that the SOC of the battery 22 will not be increased significantly. In other words, it will take longer time to fully charge the battery 22. If the SOC of the battery 22 reached the upper limit, the regenerative braking force cannot be established by the motors 3 and 18 and hence the engine braking force derived from pumping loss and friction loss of the engine 1 has to be used instead of the regenerative braking force. According to the preferred example, however, it takes long time that the SOC of the battery 22 reaches the upper limit so that the frequency to use the engine 1 to establish the engine braking force can be reduced.

By contrast, if the SOC of the battery 22 is higher than the first threshold level α2 so that the answer of step S5 is NO, the engine 1 is rotated compulsory or passively at step S7 to generate the engine braking force derived from the pumping loss and the friction loss so as to establish the deceleration torque. Situation during establishing the engine braking force is indicated in the nomographic diagram shown in FIG. 5. In this case, the second motor 18 is used as a generator to establish the deceleration torque (<0) Tm. The electric power generated by the second motor 18 is supplied to the first motor 3 to rotate the first motor 3 in the forward direction. Consequently, the output shift 4 of the engine 1 being halted by the brake 8 as a one-way clutch is rotated compulsory in the forward direction by the forward torque applied to the carrier 11. In this situation, since the fuel supply to the engine 1 is stopped, deceleration torque Tep resulting from a reaction against the friction to rotate the engine 1 compulsory is applied to the ring gear 10 or the output gear 14 in the direction to reduce the rotational speed thereof. Thus, during establishing the engine braking force, the drive torque (i.e., the deceleration torque) Tp is governed by the torque Tm of the second motor 18 and the reaction torque Tep resulting from rotating the engine 1 compulsory.

According to the preferred example described, the deceleration torque is thus established by the engine 1 at step S7 in case the battery 22 cannot be charged. That is, the regenerative braking using the motor 3 and 18 is allowed to be executed at step S4 or S6 only when the battery 22 can be charged while consuming the electric power generated by the second motor 18 by the first motor 3. For this reason, the battery 22 can be prevented from being fully charged frequently. In other words, if the SOC of the battery 22 is increased, it takes long time to reach the upper limit and hence the frequency to rotate the engine 1 compulsory can be reduced to prevent discomfort resulting from unintentional rotation of the engine 1.

Figure 4:
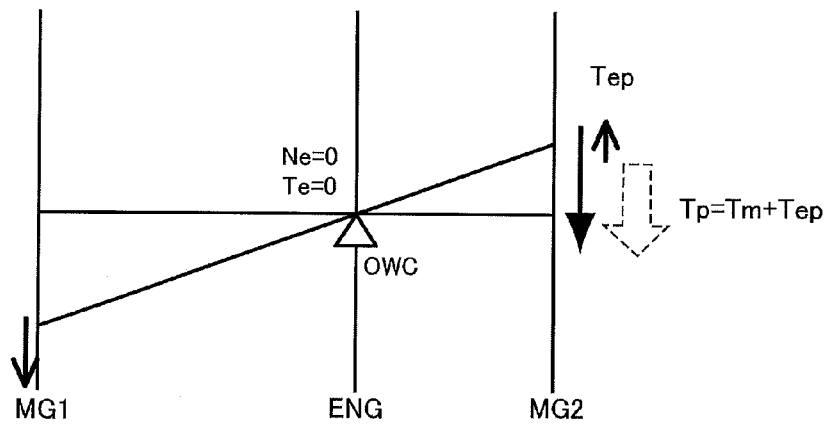
FIG. 4 is a nomographic diagram indicating a braking force control carried out at step S6.
Figure 5:
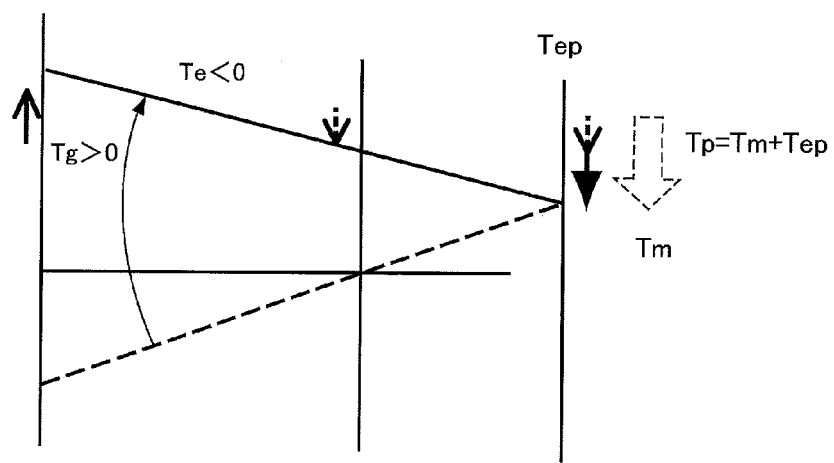
FIG. 5 is a nomographic diagram indicating a braking force control carried out at step S7.

Here, it is to be noted that the torques of the motors 3 and 18 are also controlled in such a manner to achieve the drive torque Tp calculated at step S2 in the situations shown in FIGS. 4 and 5, as in the situation shown in FIG. 3.

It is to be understood that the control system is not limited to the foregoing preferred example, but various kinds of modifications may be made within the spirit of the present invention.

What is claimed is:

1. A control system for a hybrid vehicle that is applied to a hybrid vehicle comprising:
   a prime mover including an engine in which an output shaft is halted by a brake, a first motor, and a second motor that applies torque to an output member and that is electrically connected to the first motor through a battery; and
   a power distribution device that performs a differential action among a first rotary element, a second rotary element, and a third rotary element;
   in which the engine is connected to a first rotary element, the first motor is connected to a second rotary element, and the output member is connected to a third rotary element;
   wherein the control system is configured to operate the second motor as a generator to regenerate energy to establish a deceleration torque while charging the battery with an electric power generated by the second motor when deceleration of the hybrid vehicle is demanded;
   wherein the control system comprises a controller that controls the first motor and the second motor; and
   wherein the controller is configured to operate the first motor as a motor to increase torque of the output member while halting the output shaft of the engine by the brake, and to increase the deceleration torque of the second motor, if a state of charge of the battery is higher than a predetermined threshold level when deceleration of the hybrid vehicle is demanded.

2. The control system for a hybrid vehicle as claimed in claim 1, wherein the controller is further configured: to calculate a required drive torque; and to control an output torque of the first motor and the deceleration torque of the second motor to achieve the calculated required drive torque.

3. The control system for a hybrid vehicle as claimed in claim 1, wherein the controller is further configured to control the first motor and the second motor to increase the deceleration torque of the second motor in an amount of the torque of the first motor to increase the rotational speed thereof.

4. The control system for a hybrid vehicle as claimed in claim 1, wherein the controller is further configured to establish the deceleration torque by the second motor without operating the first motor as a motor if the state of charge of the battery is lower than the predetermined threshold level when a deceleration of the vehicle is demanded.

5. The control system for a hybrid vehicle as claimed in claim 1, wherein the threshold level is set to be lower than an upper limit level of the state of charge of the battery.

* * * * *